Patented Oct. 7, 1930

1,777,953

UNITED STATES PATENT OFFICE

OSCAR BALLY AND PAUL GROSSMANN, OF BASEL, SWITZERLAND, ASSIGNORS TO SOCIETY OF CHEMICAL INDUSTRY IN BASLE, OF BASEL, SWITZERLAND

AMINO-ANTHRAQUINONE DERIVATIVES AND PROCESS OF MAKING SAME

No Drawing. Application filed July 16, 1928, Serial No. 293,302, and in Switzerland August 4, 1927.

This invention relates to the manufacture of new products by causing an aldehyde which contains more than one carbon atom to act, in the form of its bisulfite compound, or in presence of bisulfite, on an anthraquinone derivative which contains at least one amino group containing itself at least one hydrogen atom. Such anthraquinone derivatives are described or mentioned in large numbers in literature.

The new products can be obtained in solid form by salting out or cautiously evaporating their solutions, or otherwise. They form orange, red, violet, blue or dark powders which dissolve in water by forming orange or red or violet or blue to greenish-blue solutions. They are suitable for many purposes, for instance for printing cotton and silk and particularly for dyeing acetyl-cellulose. The advantage of using them resides in the fact that they are very easily dissolved or dispersed in water and that from their solutions or suspensions they are dyeing acetyl-cellulose or acetate-silk in a smooth manner.

The following examples illustrate the invention, the parts being by weight:—

Example 1

10 parts of 1:4:5:8-tetramino-anthraquinone of the formula

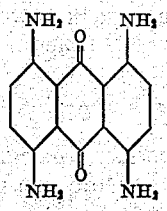

are heated, while stirring, with 15 parts of benzaldehyde, 75 parts of a solution of sodium bisulfite containing 40 per cent. by volume of commercial sodium bisulfite liquor and 50 parts of water for 1 hour at 90° C. until all has passed into solution. This solution may be used directly for dyeing or may be evaporated to dryness, in which case a powder completely soluble in water is obtained. Acetate silk may be dyed with this product as follows: 1 part of this dyestuff is dissolved or suspended in 300 parts of water and 10 parts of acetate silk are introduced into the solution at 40–50° C. The bath is heated to 75° C. and maintained at this temperature for ¼ hour. The material is then washed, dried and, if necessary, brightened. The acetate silk is dyed in fast bright blue tints. In like manner furfurol may be used for obtaining a product which apparently corresponds with an ω-furfurylsulfonic acid. Like products are obtained when croton aldehyde or acetaldehyde is used.

The example may be carried out with other aminoanthraquinones than that named, for instance 1:4-, 1:5- or 1:8-diaminoanthraquinone; the various 1-alkyl- or 1-aralkyl- or 1-aryl-amino-4-aminoanthraquinones, such as 1-aminomethyl-4-aminoanthraquinone, 1-phenylamino-4-aminoanthraquinone, 1-amino-4- (4'-amino)-phenylaminoanthraquinone; polyaminoarylamino-anthraquinones; such as 1:5-diamino-4-phenylaminoanthraquinone or 1:5-diamino-4:8-diphenylaminoanthraquinone; the hydroxy-derivatives, such as 1:4-aminohydroxy- or 1:5-diamino-4:8-dihydroxyanthraquinone; the halogenaminoanthraquinones, such as 5-chloro-1:4-aminoanthraquinone.

Example 2

20 parts of 1-amino-4-hydroxyanthraquinone of the formula

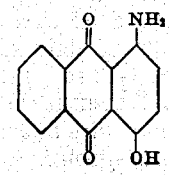

are stirred with 180 parts of a mixture of 500 parts of ammonium bisulfite of 40 per cent strength and 200 parts of benzaldehyde, until a clear solution is produced.

Probably the following reaction has taken place:

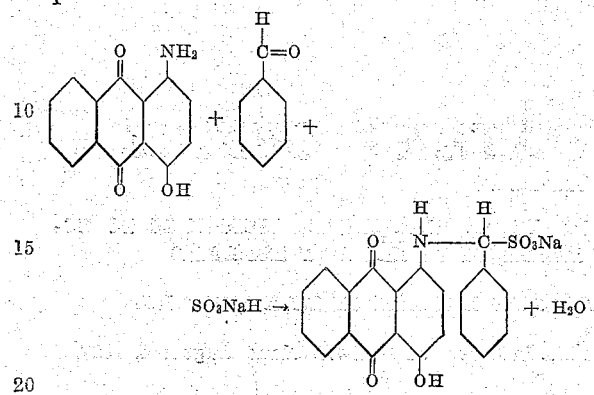

Example 3

10 grams of monomethyl-1.4-diamino-anthraquinone are introduced while stirring well into a solution of 40 grams of benzaldehyde in ammonium bisulfite of 40 per cent. strength; to this suspension 10 drops of concentrated formic acid of 83.5 per cent. strength are added. After a short time it dissolves at ordinary temperature whereby the mass becomes intensively blue colored. After stirring during 24 hours partial separation of bronze glittering small crystals occurs at ordinary temperature. By addition of 50 ccm. of water the mass is transformed to dry content of 10 per cent. The product thus obtained is a bronze glittering paste which dissolves in water and particularly in water containing somewhat of ammonia to violet-blue coloration.

By filtering with suction the above described dyestuff-paste, and by pressing off and drying there is obtained a deep-blue powder which dissolves very easily in water.

What we claim is:—

1. A manufacture of new anthraquinone derivatives by causing an aldehyde which contains more than one carbon atom to act in presence of alkali (this expression including also ammonium) bisulfite on an anthraquinone derivative which contains at least one primary amino-group.

2. A manufacture of new anthraquinone derivatives by causing an aldehyde which contains more than 6 carbon atoms to act in presence of alkali (this expression including also ammonium) bisulfite on an anthraquinone derivative which contains at least one primary amino-group.

3. A manufacture of new anthraquinone derivatives by causing benzaldehyde to act in presence of alkali (this expression including also ammonium) bisulfite on an anthraquinone derivative which contains at least one primary amino-group.

4. A manufacture of new anthraquinone derivatives by causing benzaldehyde to act in presence of alkali (this expression including also ammonium) bisulfite on an anthraquinone derivative which contains at least two amino-groups of which at least one is a primary amino-group.

5. A manufacture of new anthraquinone derivatives by causing benzaldehyde to act in presence of alkali (this expression including also ammonium) bisulfite on an anthraquinone derivative which contains at least two α-amino-groups of which at least one is a primary amino-group.

6. A manufacture of new anthraquinone derivatives by causing benzaldehyde to act in presence of alkali (this expression including also ammonium) bisulfite on an anthraquinone derivative which contains at least four α-amino-groups of which at least two are primary amino-groups.

7. As new products the compounds which are obtained by causing an aldehyde which contains more than one carbon atom to act in presence of alkali (this expression including also ammonium) bisulfite on an anthraquinone derivative which contains at least one primary amino-group, which products form orange, red, blue or dark powders, disperse in water to orange, red, violet or blue coloration and dye from aqueous dyeing-baths esters and ethers of cellulose, particularly acetate silk, similar tints.

8. As new products the compounds which are obtained by causing an aldehyde which contains more than 6 carbon atoms to act in presence of alkali (this expression including also ammonium) bisulfite on an anthraquinone derivative which contains at least one primary amino-group, which products form orange, red, blue or dark powders, disperse in water to orange, red, violet or blue coloration and dye from aqueous dyeing-baths esters and ethers of cellulose, particularly acetate silk, similar tints.

9. As new products the compounds which are obtained by causing benzaldehyde to act in presence of alkali (this expression including also ammonium) bisulfite on an anthraquinone derivative which contains at least one primary amino-group, which products form orange, red, blue or dark powders, disperse in water to orange, red, violet or blue coloration and dye from aqueous dyeing-baths esters and ethers of cellulose, particularly acetate silk, similar tints.

10. As new products the compounds which are obtained by causing benzaldehyde to act in presence of alkali (this expression including also ammonium) bisulfite on an anthraquinone derivative which contains at least two amino-groups of which at least one is a primary amino-group, which products form orange, red, blue or dark powders, disperse in water to red, violet or blue coloration and dye from aqueous dyeing-baths esters and ethers of cellulose, particularly acetate silk, similar tints.

11. As new products the compounds which are obtained by causing benzaldehyde to act in presence of alkali (this expression including also ammonium) bisulfite on an anthraquinone derivative which contains at least two α-amino-groups of which at least one is a primary amino-group, which products form orange, red, blue or dark powders, disperse in water to red, violet or blue coloration and dye from aqueous dyeing-baths esters and ethers of cellulose, particularly acetate silk, similar tints.

12. As new products the compounds which are obtained by causing benzaldehyde to act in presence of alkali (this expression including also ammonium) bisulfite on an anthraquinone derivative which contains at least four α-amino-groups of which at least one is a primary amino-group, which products form orange, red, blue or dark powders, disperse in water to blue to green-blue coloration and dye from aqueous dyeing-baths esters and ethers of cellulose, particularly acetate silk, similar tints.

13. Material dyed with the dyestuffs of claim 7.

14. Material dyed with the dyestuffs of claim 8.

15. Material dyed with the dyestuffs of claim 9.

16. Material dyed with the dyestuffs of claim 10.

17. Material dyed with the dyestuffs of claim 11.

18. Material dyed with the dyestuffs of claim 12.

In witness whereof we have hereunto signed our names this 5th day of July, 1928.

OSCAR BALLY.
PAUL GROSSMANN.